United States Patent [19]
Pierce

[11] Patent Number: 4,739,620
[45] Date of Patent: * Apr. 26, 1988

[54] SOLAR ENERGY POWER SYSTEM

[76] Inventor: John E. Pierce, 621 Carlton Dr., Augusta, Ga. 30909

[ * ] Notice: The portion of the term of this patent subsequent to Dec. 16, 2003 has been disclaimed.

[21] Appl. No.: 942,308

[22] Filed: Dec. 16, 1986

Related U.S. Application Data

[63] Continuation-in-part of Ser. No. 839,141, Mar. 13, 1986, Pat. No. 4,628,692, which is a continuation-in-part of Ser. No. 567,694, Jan. 3, 1984, abandoned, which is a continuation-in-part of Ser. No. 184,144, Sep. 4, 1980, abandoned.

[51] Int. Cl.$^4$ .............................................. F03G 7/02
[52] U.S. Cl. ..................... 60/641.8; 60/659; 60/660
[58] Field of Search ............. 60/641.8, 641.13, 641.14, 60/641.15, 659, 660

[56] References Cited

U.S. PATENT DOCUMENTS

2,942,411 6/1960 Hutchings ........................ 60/641.8
4,628,692 12/1986 Pierce ............................... 60/641.8

Primary Examiner—Stephen F. Husar
Attorney, Agent, or Firm—James J. Brown

[57] ABSTRACT

A power system for use in converting solar energy into useful and stored energy available as output power capable of operating diverse types of power-driven units, such as electric generators, air conditioners, etc. The power system includes solar heat collector means, motor means a compressor system and power storage means. The solar collector system utilizes the sun's rays to heat a liquid medium, such as a refrigerant and convert it into a gas, with the expanded gas being delivered to large motor means. The large motor means is used in part to operate a power-driven unit and in part to drive a substantially smaller motor means operable to pressurize a compressor gas in accordance with the principle of hydraulic pressurization. The combination of the large and small motor means allows the pressure of the solar heated medium to greatly magnify the pressure developed on the compressor gas, which is transferred to the power storage system. Control means is operatively associated with the large and small motor means and operable to adjust the ration of pressurization in response to temperature and/or pressure changes in the solar heat collector means. Appropriate valve means, valve operating means and recycling condensors are operatively associated with the compressor system and the solar collector for effecting a continued operation of the power system.

15 Claims, 5 Drawing Sheets

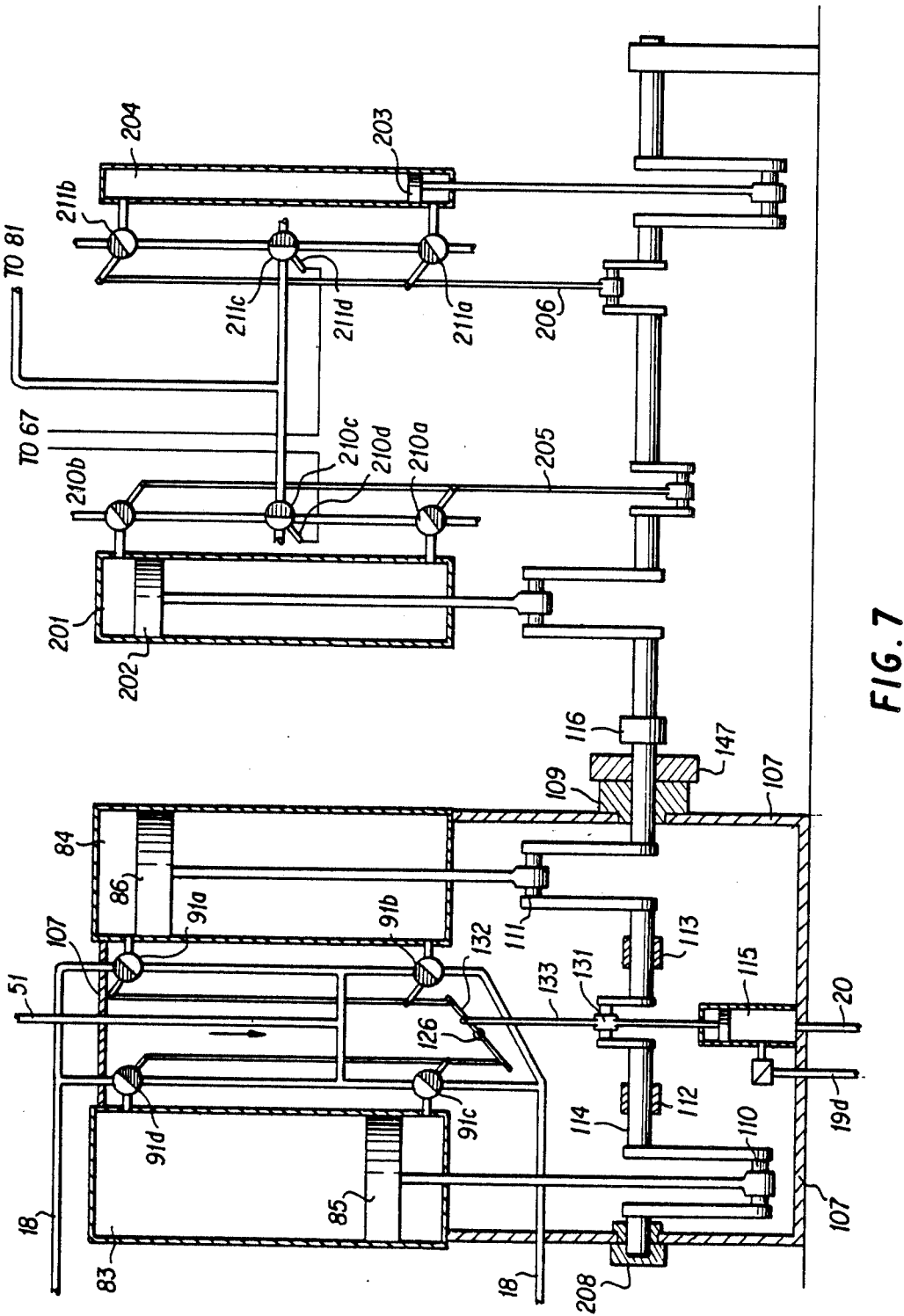

SOLAR ENERGY POWER SYSTEM

REFERENCE TO RELATED PATENT

This application is a continuation-in-part of my earlier U.S. Ser. No. 839,141, filed 03/13/86, now U.S. Pat. No. 4,628,692 issued 12/16/86, which is a continuation-in-part of 06/567,694 filed 01/03/1984, now abandoned, which is a continuation-in-part of 06/184,144 filed 09/04/80, now abandoned.

BACKGROUND OF THE INVENTION

This invention relates to a solar powered system and is more particularly concerned with the utilization of a pressure magnification principle to transform solar-developed input pressure into a greatly magnified output pressure storable for use as needed.

A number of devices have been developed in the past for converting heat energy from the sun into energy usable for propulsion of electric generators, pumps and the like. Some such devices are described in U.S. Pat. Nos. 2,942,411; 2,969,637; and 3,903,700. The systems described in the above patents have very low efficiency and utilize a number of pumps and motors which consume a large percentage of the power developed or require concentration or focusing of the sun's rays by the use of reflectors to produce temperatures higher than the boiling point of water.

SUMMARY OF THE INVENTION

The disadvantages of the prior art have been overcome by the present invention, which basically includes the feature of controlled pressure magnification to transform solar-heat-developed pressure into greatly increased storage pressure available on demand for operating power-driven units. The present invention does not rely upon the use of reflectors to concentrate the sun's rays nor upon the boiling of water to produce steam but employs fluids which boil at temperatures far below the boiling point of water to generate pressured gas for energy conversion. These fluids undergo change of state from liquid to gas at temperatures well within those achieved in typical solar panels even during periods when solar radiation (insolation) is very moderate.

Another feature of the present invention includes the combination of a solar-boiler heat engine and a gas compressor whereby the heat of compression is used to employ conserved power or energy.

A characteristic of special importance is the utilization of said combined engine and compressor to provide storage of latent energy in the form of compressed gas available on demand to perform work.

A further feature of the present invention includes control means operable for adjusting the ratio of pressurization between the said engine and the compressor in response to pressure changes in a collector system and in storage tanks or in other parameters.

BRIEF DESCRIPTION OF THE DRAWINGS

FIG. 7 illustrates another alternative embodiment of a mechanism permitting adjustment of the ratio of pressurization.

DESCRIPTION OF THE ILLUSTRATIVE EMBODIMENTS

Figure 1:
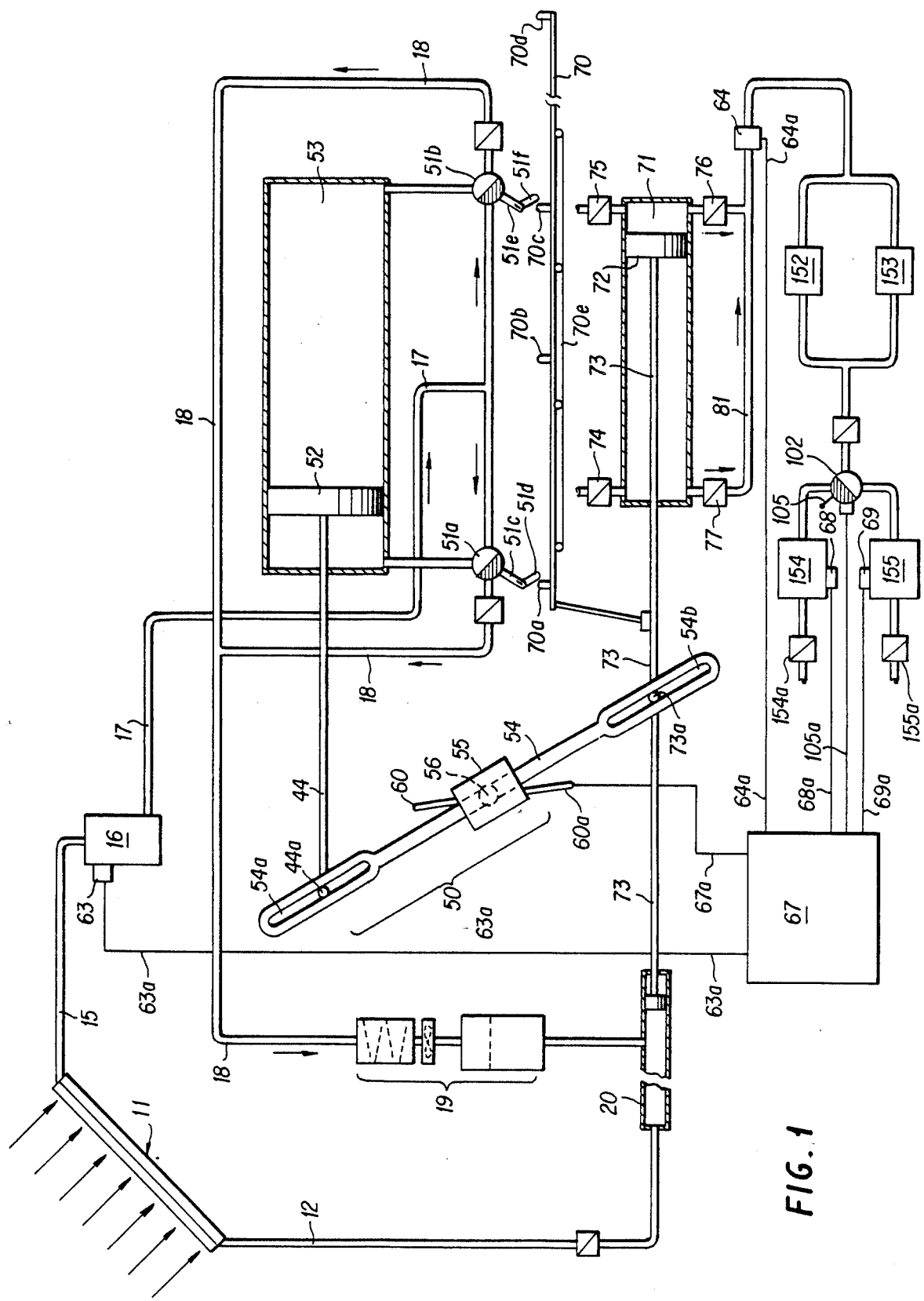
FIG. 1 is a schematic drawing illustrating one embodiment of the invention operable by the use of reciprocating pistons in both heat engine and compressor.

Referring to the drawings, the solar power system of the present invention will be described with reference to the five principal components of the invention; a solar collector system, a heat engine, a compressor system, an energy storage and work system and a pressurization control system.

Directing attention to FIG. 1, the solar collector system itself includes a sealed solar panel 11 containing a medium such as refrigerant R-113, which has a boiling point of 117.6 degrees Fahrenheit at a pressure of one atmosphere, which is heated by the sun's rays and converted from a liquid to a pressured gas for effecting operation of the heat engine and the compressor system. The solar panel so applied is thus referred to as a solar boiler. The pressured gas flows from said solar boiler through tube 15 to collector tank 16, which is designed to provide temporary storage and to aid in controlling fluctuations in input and output pressures, and then flows through conduit 17 to the energy conversion system for energy conversion operation and flows from the energy system through pipe 18 and condensor 19 for return to the solar boiler 11 as a liquid.

In a first embodiment, which is illustrated in FIG. 1, the energy conversion system, which receives pressured gas from conduit 17 through valves 51a and 51b, includes a first relatively large cylinder 53 and piston 52. The reciprocating movement of piston 52 is conveyed by connecting rod 44, control linkage 50 and connecting rod 73 to cause a reciprocating movement of piston 72 within smaller cylinder 71 which compresses air or other gas drawn in through check valves 74 and 75 and expelled under pressure through check valves 76 and 77 and conduit 81 to storage tanks 154 and 155.

Shift bar 70 rides on track 70e and is designed to duplicate every movement of rod 73. As piston 72 nears the right end of cylinder 71 shift bar 70 also reaches its right extreme. Thus nib 70a strikes pivoted lever 51d so that it turns slotted arm 51c and shifts valve 51a to open tube 17 permitting pressured gas to enter the left end of cylinder 53 and move piston 52 to the right. Similarly nib 70c strikes lever 51f shifting valve 51b so that piston 52 can expel expanded gas from the right end of cylinder 53 into tube 18. As piston 52 nears the right end of cylinder 53 piston 72 nears the left end of cylinder 71 and shift bar 70 approaches its left extreme so that nib 70b strikes lever 51d and nib 70d strikes lever 51f thus reversing valves 51a and 51b. This permits pressured gas to enter the right end of cylinder 53 from tube 17 forcing piston 52 toward the left and expelling expanded gas into tube 18.

Rocker arm 54 in control linkage 50a has a slot at one end and a slot 54b at the other end. Slot 54a slidably receives a drive pin 44a mounted on connecting rod 44 whereby connecting rod 44 causes rocker arm 54 to oscillate about fulcrum stud 56. A drive pin 73a mounted on connecting rod 73 slides in slot 54b whereby pivotal movement of rocker arm 54 causes reciprocal movement of piston rod 73. Movement of the two connecting rods may be stabilized by studs extending beyond each of the two drive pins riding in tracks parallel to said connecting rods in the base or table which also contains track 60.

Figure 3A:
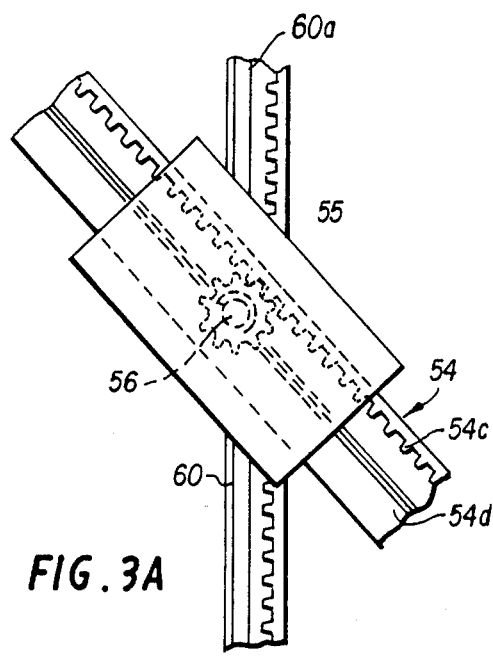
FIGS. 3A-C illustrate the details of the pressurization ratio control mechanism of FIG. 1.
Figure 3C:
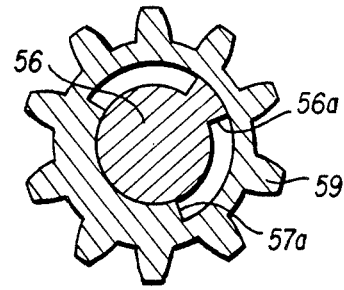
Figure 3B:
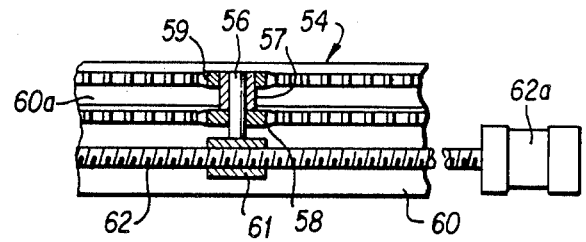

As shown diagramatically in FIG. 1 and FIG. 3, relative movement of pistons 52 and 72 is controlled by varying the position of the fulcrum in pressurization-control linkage 50. A rocker arm 54 in control linkage 50 is supported by a sleeve 57 which is mounted pivotally on stud 56, which serves as a fulcrum. Stud 56 is mounted pivotally on an internally threaded collar 61 which is mounted on a complimentarily threaded rod 62. As servo motor 62a turns rod 62, collar 61 and stud 56 travel along track 60, and gear 58 affixed to stud 56 meshes with geared track 60a causing stud 56 to rotate. Stop 56a impinges upon stop 57a causing sleeve 57 to rotate thus turning gear 59 affixed thereto. As gear 59 meshes with the gear track 54c in rocking arm 54, the combined effect of the turning of gear 59 and the oscillation of said rocker arm 54 is that the movement of fulcrum stud 56 relative to track 60 is substantially matched by its movement relative to slot 54d of the rocker arm. Yet rocker arm 54 continues to oscillate freely as allowed by the positioning of stops 56a and 57a.

An increase in the rate of solar heat absorption (insolation) in solar panel 11 causing increased pressure in accumulator 16 signaled by sensor 63 to control unit 67, assuming no contrary signal from other sensors, results in activation of motor 62a to move fulcrum 56 slightly toward rod 44. Thus reciprocating movements of piston 52 are shortened, but piston 72 continues to traverse substantially the full length of cylinder 71 to assure full compression. A decrease in insolation would produce an opposite movement of fulcrum 56 causing piston 52 to move with longer strokes and continuing to move piston 72 through the full length of cylinder 71 with each stroke employing increased leverage to improve compression. Because cylinder 71 has a smaller diameter than cylinder 53 pressure achieved in cylinder 71 represents a multiple of the pressure in cylinder 53. This ratio of pressurization is increased as fulcrum 56 moves toward rod 73 because of the greater leverage with which rocking arm 54 transmits the pressure generated by movement of piston 52.

With relatively high insolation, piston 52 travels somewhat less than the full length of cylinder 53 so that pressured gas entering from tube 17 may be expelled into tube 8 before full expansion at higher pressure than during periods of lesser insolation. This condition induces condensation at higher temperatures as insolation increases thus supplying greater inputs of liquid refrigerant at solar boiler 11 as the need increases.

In a particularly preferred embodiment of the present invention multiple pressure sensors are provided throughout the system and their readings compared differentially at pressure control unit 67. Control unit 67 is a simple computer receiving signals from sensors illustrated by numbers 63, 64, 68, 69 and 105 through corresponding transmission lines 63a, 64a, 68a, 69a, and 105a. These signals are processed in accordance with preset instructions, which may be adjustable manually or by servo mechanism. Transmission of signals would ordinarily be by electric currents but in some applications would be hydraulic involving use of sylphons to force a liquid through tubes. In some embodiments control may be achieved by monitoring temperature changes in the system.

As pressure in tank 154 reaches a predetermined level approaching by preset degree the pressure at 105, valve 102 operates on a signal from control unit 67 to switch inputs to tank 155 for as long as pressure in tank 155 is lower in specified degree than pressure at sensor 105. As pressure in both 154 and 155 approaches that of 105 fulcrum 56 is moved toward rod 73 to increase the leverage with which compression occurs and thus the pressure levels to be reached in storage tanks. The fulcrum position is thus resultant from the combination of pressure at sensor 63 and pressure at sensor 105. Control pressures preset in control unit 67 may be determined manually in some embodiments or by automatic servo mechanisms of conventional types in others.

In the present invention, the heat of compression is not simply wasted but is to be utilized in an economizer, as illustrated diagrammatically at position 152, or for any other purpose, such as in a heat pump or water heater, as illustrated at position 153. Techniques in either case are omitted from the drawings because readily available in conventional practice.

The principal output of the solar energy power system presented is in the form of compressed gas held at ambient temperatures and relatively high pressures, such as 300 psia, for performance of work on demand. In some applications, however, the storage of latent power is less important in this invention than the use of power currently provided. Thus a portion of the energy produced by said heat engine may be used to operate a power-driven device and the remainder of such energy used to compress a gas in order to store latent energy for use as needed, or the system may apply energy to either use intermittently. If the power system is applied to air conditioning, for example, much of the demand for power is concomitant with inputs of insolation, and need for storing of latent power is reduced to that needed during hours of poor or absent insolation. In some embodiments involving cooling, the gas compressed in cylinder 71 may be a refrigerant to be stored as liquid under pressure then evaporated for cooling when and where needed and returned to valves 74 and 75 for recompression. The device illustrated in FIG. 1 involves but one cylinder as a heat engine and one cylinder as a compressor. It should be understood that any number of such cylinders or combinations may be utilized, depending upon the output demands decided upon for the system.

Figure 2:
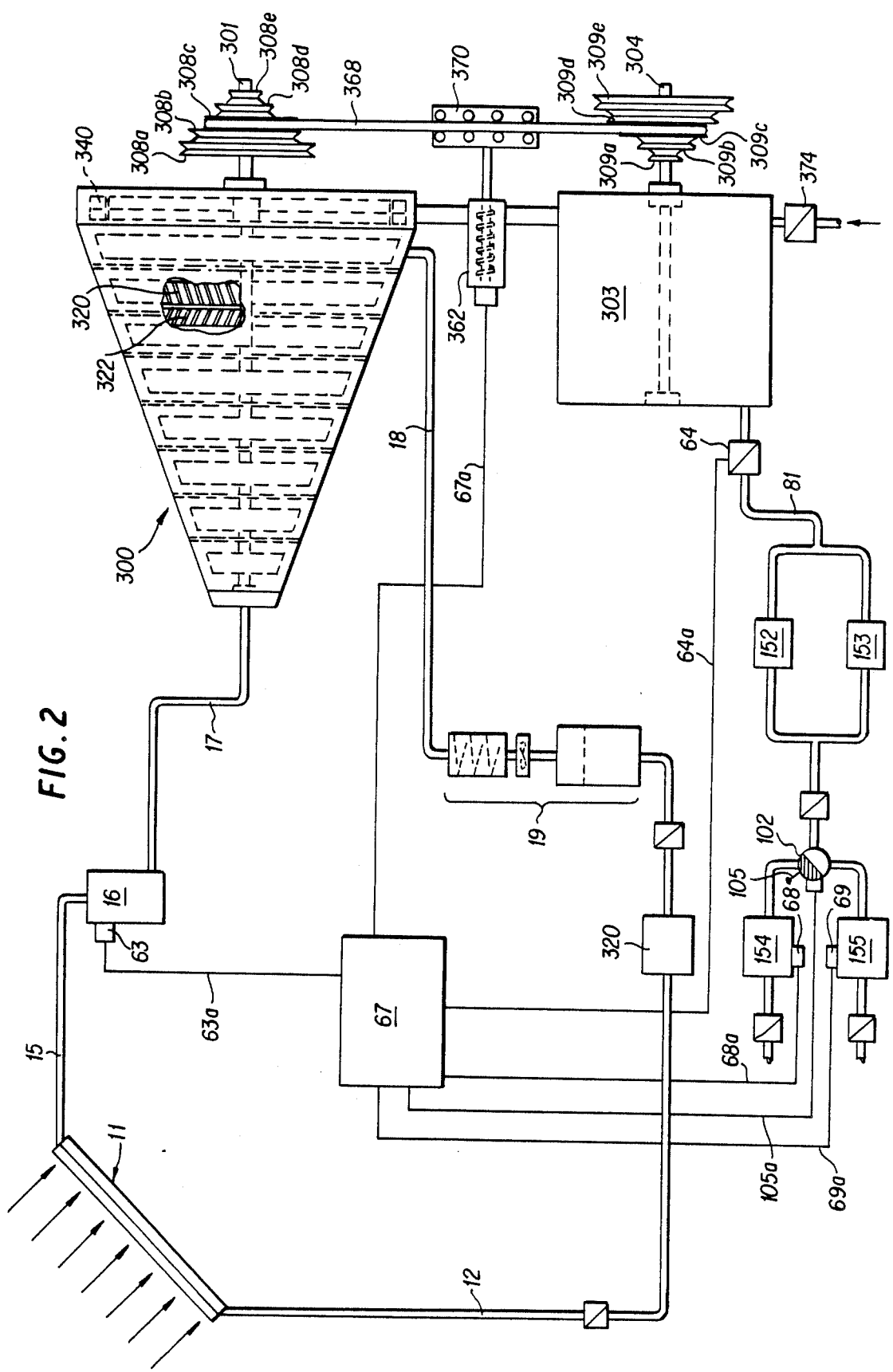
FIG. 2 illustrates a turbine as the heat engine and a rotary compressor in another alternative embodiment permitting storage of energy not currently used.
Figure 4:
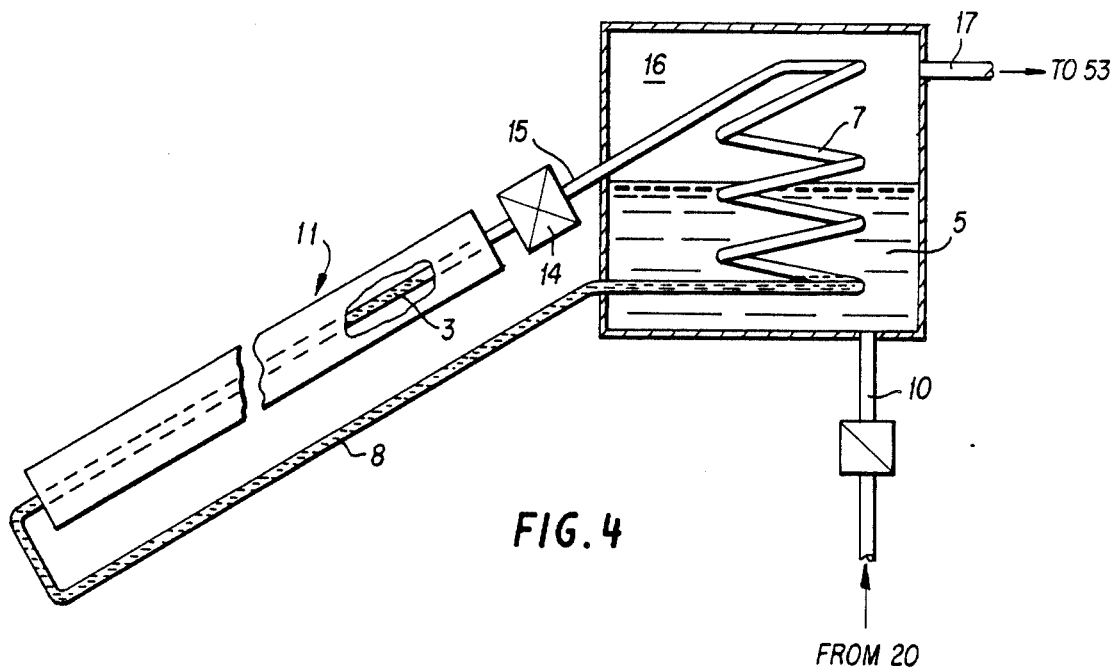
FIG. 4 illustrates the details of a heat exchanger used in one embodiment of the invention employing two different fluids.
Figure 5:
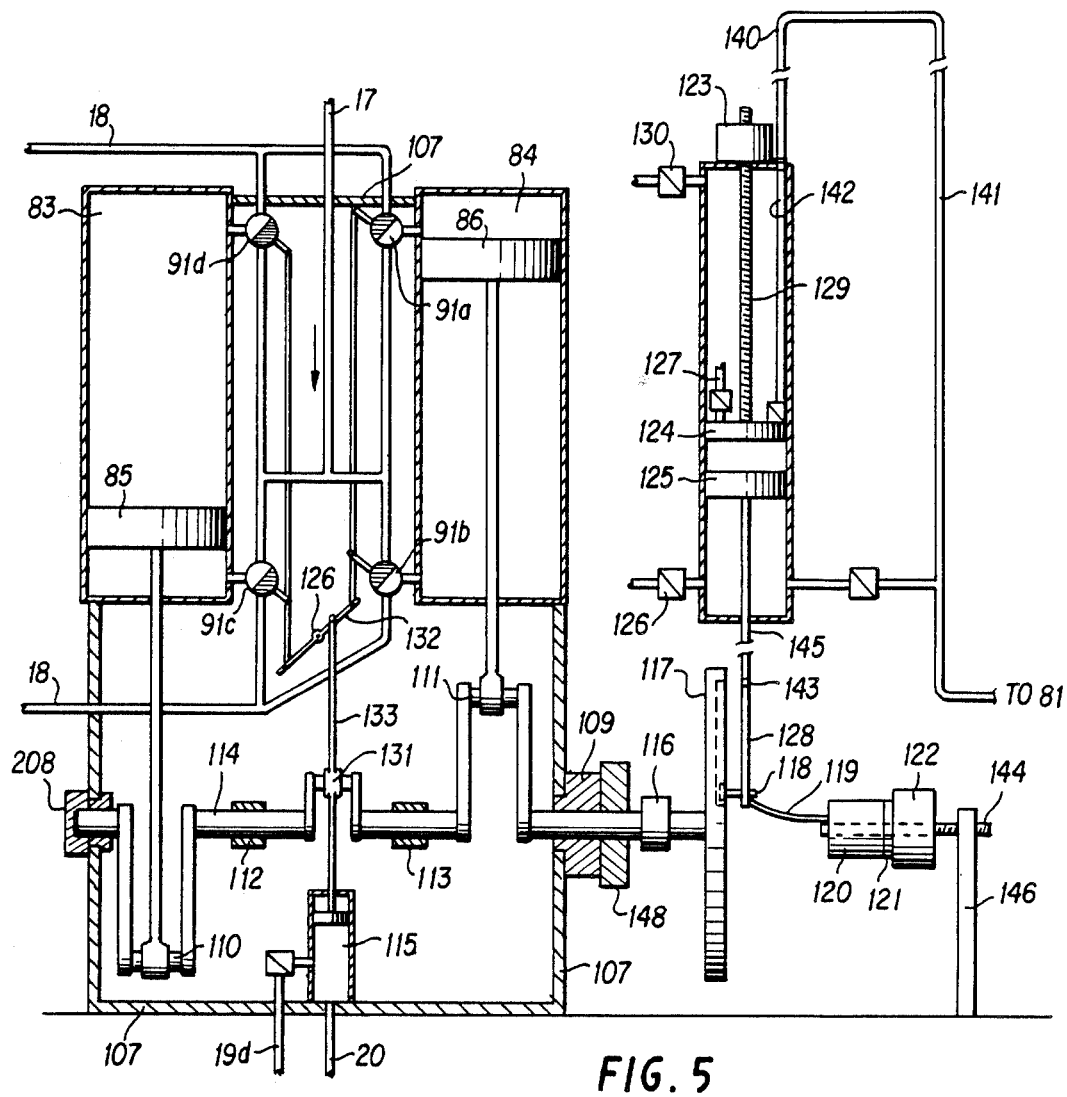
FIG. 5 shows the details of an alternative reciprocating engine and compressor embodiment.

In most embodiments of the present invention, including those disclosed above and in FIGS. 2, 5, and 7, two distinct refrigerants are utilized in a dual system to achieve certain advantages of economy and efficiency. The refrigerant referred to in FIG. 4 by the number 3 is a comparatively low pressure fluid which changes rather little in pressure within the range of temperatures encountered in the solar boiler, for example R-113 which has a pressure of 6.9 psia at 80° F. and reaches a pressure of 41.2 psia at 180° F. Because of its relatively low maximum pressures, as further assured by inclusion of an escape valve 14 in tube 15, materials used in construction of the solar panel need not be strong enough to withstand the high pressures needed for maximum efficiency in the energy conversion system. The refrigerant undergoes change of state in the solar boiler and enters tube 15 and component 16 as a gas. Its heat is given up to a relatively high pressure refrigerant, indicated by number 5, by change of state involving reversion to the liquid form in component 16, which thus serves as a heat exchanger and as a condensor for refrigerant number 3 and also as a boiler for refrigerant number 5.

This latter high-pressure refrigerant 5 may be illustrated by R-12, which has a pressure of 98.9 psia at a temperature of 80° F. and reaches a pressure of 334 psia at 180° F. The pressure change of 235 psia in the range of temperatures indicated is sufficient for substantial efficiency of the energy converter, whether of the reciprocating or turbine variety. The use of gravity feed for a number of refrigerants heated in solar panels and used in heat exchangers as an efficient means of transferring solar energy in the form of heat is well established, as indicated in "Freon Product Information—Solar Fluids," RT-65, published by E.I. DuPont de Nemours & Co., Inc. The pressured gas generated by the above described process in component 16 enters tube 17 and is used in energy conversion then returned as a gas by tube 18 retaining pressure sufficient for condensation in condensor 19 and returned by feed pump 20 through tube 10 to heat exchanger 16 for another cycle.

FIG. 2 shows a substantially different embodiment of the solar power device in which the heat engine 300 is in the form of a turbine and a rotary compressor 303 is utilized to provide a source of compressed air or gas for storage to provide latent power upon demand. The turbine shown is of a type which might be appropriate for a large industrial application or a municipal power system. Solar rays strike panel 11 causing the liquid refrigerant to undergo change of state to form a pressured gas. If only one refrigerant is used the pressured gas is accumulated in tank 16 and then flows through conduit 17 to turbine 300. An illustration of certain blades of one of the rotors is shown at 320, and certain blades of the adjacent stator are shown at 322 to make clear the turbine's energy conversion operation. Other rotors and stators have blades similar to those illustrated, so that the pressured gas entering through tube 17 turns the turbine at high speed in the course of expanding, following which the gas enters conduit 18 and moves on to condensor 19 retaining sufficient pressure to assure condensation, following which the resulting liquid is moved by rotary feed pump 320 through tube 12 back to solar boiler 11 for its next cycle. After reduction gears 340 have slowed rotation transmitted to shaft 301 its rotation is transmitted by belt 368 to shaft 304 of compressor 303. A bank of pulleys of descending size is mounted on shaft 301 and a complementary bank of pulleys of ascending size is mounted on shaft 304. FIG. 2 shows belt 368 engaged in pulleys 308c of the turbine and 309c of the rotary compressor. These two pulleys are of intermediate diameters thus transmitting the rotation of shaft 301 to shaft 304 with little change in speed. The compressor draws in air or other gas through check valve 374 and then expels it at greatly increased pressure through check valve 64, which includes a pressure sensor. The relatively small size of compressor 303 as compared with turbine 300 helps to account for the fact that the pressure of gas emitted into tube 81 represents a multiple of the pressure of gas entering turbine 300 through tube 17. Adjustment in this ratio of pressurization is achieved by shifting belt 368 from one pair of pulleys to another. As belt 368 is shifted from pulley 308c and pulley 309c to pulley 308b and pulley 309b there is an increase in the speed with which shaft 304 turns and thus with the volume of gas compressed and supplied through tube 81 for storage in tanks 154 and 155. Such an increase in speed would be consistent with increased insolation striking solar boiler 11 and increased pressure in accumulator 16 or with reduced pressure in storage tank 154 or 155 as utilization of stored power exceeds new inputs. If belt 368 is moved to pulleys 308d and 309d, on the other hand, there is a substantial reduction in the speed of rotation of shaft 304 which would be expected with reduced insolation and reduced pressure in accumulator 16 or with increased pressure in storage tanks 154 and 155, since greatly increased leverage would be inherent in the positions of the two banks of pulleys so that, though turning more slowly, the compressor would have power to generate higher pressure.

Belt 368 is controlled by signals from control unit 367 transmitted through channel 67a to stepper motor 362, which moves guide 370 to shift the belt from one set of pulleys to another as needed to alter the ratio of pressurization. Motor 362 contains a threaded shaft upon which is mounted a rotor which is threaded internally in a complementary manner so that turning of the rotor moves the threaded shaft and in so doing moves guide 370 and belt 368. Choice of which tank is to be open for receipt of new pressurized gas for storage will also be determined in accordance with preset instructions. It will be noted that components identified in FIG. 2 by the same numbers as those used in FIG. 1 operate in a manner quite similar for either of the two systems, whereas numbers beginning with 300 represent the components which are peculiar to the turbine and rotary compressor of FIG. 2.

As with the reciprocating engine and compressor of FIG. 1, the turbine and rotary compressor of FIG. 2 may also make use of dual refrigerants advantageously as illustrated in FIG. 4 and its specifications.

Solar panels covering one acre of land would produce some 8,700,000 BTU of energy per hour (assuming an average of 200 BTU per square foot per hour) during the eight hours of greatest insolation, probably sufficient to provide power for a village of 240 residences during the season of maximum need for air conditioning. By the use of multiple turbines and compressors larger areas could be supplied adequate electric power except during extended periods of low insolation, when it might prove economical to use alternate power sources, if available. With smaller equipment, on the other hand, individual residential or commercial units could be supplied needed power.

FIG. 5 illustrates yet a further embodiment of the present invention wherein, as in FIG. 1, the expanded vapor from solar panel 11 flows from accumulator 16 through conduit 17 as heretofore described. Valves 91a and 91c are open to conduit 17 allowing the pressured gas to enter cylinders 83 and 84 behind their respective pistons 85 and 86 which thus move in opposite directions, each moving toward the end of its cylinder opposite to the position shown, thus turning crankshaft 114 at 110 and 111 and thereby moving bearing 131 and control rod 132 about the fixed pivot 126 causing valves 91b and 91d to open toward tube 17 while valves 91a and 91c close to tube 17. Upon completion of this movement pistons 85 and 86 are ready to begin their return to the positions shown in FIG. 5, pushing the spent gas out through valves 91a and 91c, which are now open to tube 18 for this purpose. The system is sealed within a housing 107, and one end of the crankshaft is sealed by cap 208. The other end of the crankshaft 114 protrudes through seal 109 for transmission of the power for use in impelling compressor 87. A rotary shaft has an advantage over alternatives because it leaks very little of the refrigerant even during a period of years duration, given the kind of seals already widely used.

Compressor 87 is activated by piston 125 as driven by piston rod 128 and flywheel 117, which also provides for variable ratios of pressurization based upon measurements of pressure at tank 16 by sensor 63 and at other points as shown in FIG. 1. If the pressure in 16 falls below a predetermined level the stroke of piston 125 is relatively short, as shown in FIG. 5, in order to avoid depleting the supply of input vapor too rapidly yet maintain the output of compressor 87 at adequate pressure though reduced volume. To do this requires that the cylinder be shortened as the stroke is shortened by lowering adjustable cylinder head 124 by means of reversible motor 123 turning screw-threaded shaft 129. The shortened stroke of 125 is achieved by positioning a pin 118, which uses the motion of the fly wheel 117 to operate the drive shaft 128 from a point near the center of the fly wheel, yet sufficiently far from the center of rotation to achieve the length of stroke desired. As the pressure in tank 16 increases it becomes possible for the compressor to pump more air by using longer strokes. Hence, the motor 123 is operated, in response to a signal from sensor 63 through control unit 67, to raise 124 while motor 122 operates to move itself on shaft 144 toward the left against the bearing 121 while also moving the rotating element 120 against rod 119 forcing it to the left and drive pin 118 and piston rod outward toward the circumference of the fly wheel thus automatically increasing the length of stroke of 125 and the quantity of air pumped. The movement of drive pin 118 is limited, however, by virtue of the pressure at sensor 68 and sensor 69 indicating pressures in storage tanks 154 and 155 (as shown in FIG. 1). If the pressure at sensor 105 is higher than in the storage tank which has the higher pressure, pumping into that tank will continue even though it is necessary to shorten the stroke of piston 125 to maintain that pressure, in a typical computer instruction controlled by unit 67. It would also be expected that if the pressure at sensor 63 falls below that of the tank having the higher pressure but is still above that of the one having the lower pressure, pumping into the latter tank will begin and so continue even though the stroke of 125 must be shortened to maintain pressure. If pressure at sensor 63 is very much above that in either storage tank, the stroke of 125 will be lengthened so long as preset levels are not exceeded. Motor 122 is reversible and must be operated in connection with the screw-threaded shaft 144 to pull the rotating assembly 120 and lever 119 to the right to draw drive pin 118 closer to the center of the fly wheel. In turn, the motor 122 would push 120 and 119 to the left to cause 118 to move out toward the circumference of the fly wheel. Drive pin 118 travels in a slot in the fly wheel in such a manner that a flange on its end fits under the edges of the slot so that it is not removable except at a point not reached in operation (such as the center). Piston rod 145 operates in a line parallel to the sides of cylinder 87 but meets 128 in a pivot 143 to permit 128 to swivel with 118 as they rotate. The assembly on shaft 144 is mounted on a fixed bracket 146.

Figure 6:
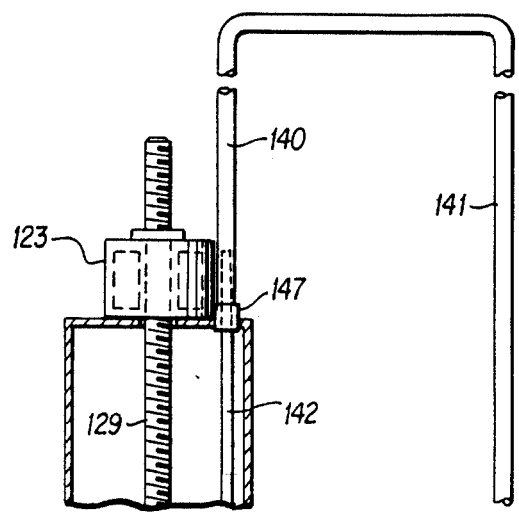
FIG. 6 illustrates certain details of the adjustable mechanism for the compressor shown in FIG. 5.

FIG. 6 shows details of 140 and 142, which is a tube passing through 124 movable with 124 through a packing ring or gasket at 147 to slide in the larger tube 140 as 124 is moved by a screw-threaded shaft 129 in adjusting the working length of cylinder 71. An electric generator 148 can be included in some embodiments to power control motors and sensors, as indicated in FIG. 5.

FIG. 7 shows an alternative embodiment of the compressor heretofore described. Crankshaft 114, as depicted in FIG. 5, actuated by pistons 85 and 86, moves piston 202 in cylinder 201 and piston 203 in cylinder 204 thereby compressing air drawn in from the atmosphere at valves 210b and 211a as these pistons begin their return strokes after reaching the ends of their respective cylinders. Valve 210a has been closed to the atmosphere in preparation for the return stroke of piston 202, which channels the air to 210c. In the present disengaged position of 210c shown in FIG. 7 this air reverts to the atmosphere. Likewise when piston 202 begins its return stroke rod 205 will open valve 210a to the atmosphere and close valve 210b so that it will channel air toward valve 210c, whence again it will be vented to the atmosphere. Hence, in its current representation cylinder 201 is disengaged from pumping compressed air to tube 81.

Cylinder 204, on the other hand, is shown in its engaged position. Here, it is beginning the stroke of piston 203 with valve 211a open to the atmosphere so that air is drawn into the cylinder as the piston moves toward valve 211b, which is open to valve 211c and thus to tube 81, but closed to the atmosphere. As the crankshaft turns it causes valve 211b to open toward the atmosphere as piston 203 starts its return and closes valve 211a toward the atmosphere causing the return of piston 203 to force air into tube 101 through valve 211c, which is closed to the atmosphere. The condition shown is appropriate for a situation in which insolation is minimal and pressure at 16 relatively low or when pressure in storage tanks 154 and 155 is approaching its upper limits, so that the entire effort of the engine is devoted to a single small compressor cylinder. As insolation increases or pressure in the storage vessels 154 and 155 decreases control media 67 closes valve 210c to the atmosphere and opens valve 211c thus disengaging cylinder 204 and engaging cylinder 201 which, because of its greater diameter, pumps a greater volume of air through valve 210c toward tube 81. Further increases in insolation or decreases in measured pressures in the storage vessels 154 and 155 cause media of 67 to reengage cylinder 204 so that both cylinders 201 and 204 are pumping air into tube 81.

By such means even the relatively small energy inputs of hours during which sunlight is not intense will continue pumping even against rather high pressures, but slowly, and the periods of intense sunlight but relatively low storage pressures will permit both cylinders to operate to produce the maximum flow of pressurized gas into the storage tanks.

Additional cylinders may be so involved in arrangements which have the effect of varying total flows to storage as pressure differentials vary, through operation of control unit 67, with preset target ranges.

Throughout this application, where one or two cylinders are shown any number can be used.

Various fluids can be used both in the solar panels of the present invention and in subsequent stages involving transmission or storage of energy. The particular selection will depend to a large degree on the requirements of the specific system. In the solar panels typically a fluid should be selected which converts to vapor within the expected operating temperatures of the panels.

Thus, a boiling point of 180° F. or lower can be suitable. The fluid should also be capable of being condensed back into the liquid stage without difficulty. The various Freons, such as Freon 114, are known to be useful in solar heating applications and are suitable in the present invention.

It is advantageous that the solar panels be oriented for maximum duration and intensity of solar exposure either by properly oriented static structure or by design permitting automatic or manual orientation toward the sun on a continuing basis.

What is claimed is:

1. An improved power system for use in converting solar energy into storable energy, said improved system comprising, in combination:
    (a) solar heat collector means operable for utilizing the sun's rays to heat a fluid medium and convert it from liquid to an expanded gas;
    (b) energy conversion means operatively connected with said solar heat collector means for utilizing said expanded gas to compress a second gas; said energy conversion means comprising a motor means for receiving said expanded gas from said heat collector means, utilizing said gas to produce mechanical energy and then returning said gas to said solar collector, and compressor means operatively connected with said motor means to use said mechanical energy to increase the pressure of a second gas;
    (c) control means operatively associated with said solar collector means and said energy conversion means to effect adjustment of the ratio of pressurization in said compressor means to the energy output of said motor means in response to change in a parameter of said expanded gas; and
    (d) storage means operatively connected with said energy conversion means for collecting and storing said pressurized second gas for subsequent use to operate a power driven unit.

2. The power system as defined in claim 1 further characterized in that said system includes boiler means operatively associated with said energy conversion means whereby the heat produced by pressurizing said second gas is utilized by said boiler means to produce a source of power.

3. The power system of claim 1 wherein both said motor means and said compressor means are each reciprocating pistons disposed within respective cylinders, said piston/cylinder which is the motor means being substantially larger in displacement than the piston/cylinder which is the compressor means.

4. The power system as defined in claim 3 further characterized in that each of said pistons is operatively connected with the other by a pivotal linkage means, and wherein said ratio of pressurization control means includes means operable for adjusting the spacing of said pivotal linkage means relative to said pistons in order to effect change in the ration of pressurization.

5. The power system as defined in claim 1 further characterized in that said fluid medium is a refrigerant.

6. The power system as defined in claim 1 further characterized in that said compressor means includes a number of larger pistons operatively connected to smaller compressor pistons by means of a crank shaft.

7. The power system of claim 1 wherein both said motor means and said compressor means are each turbines or either is a turbine.

8. The power system of claim 1 which further includes condensor means for receiving said expanded gas from said solar motor means, converting it back to a liquid and returning it to said solar heat collector.

9. The power system of claim 1 wherein heat exchanger means is disposed intermediate of said solar heat collector means and said energy conversion means for receiving said expanded gas from said heat collector passing it in heat exchange relationship with a heat exchange medium, and returning it, in a closed system to said heat collector whereby a substantial portion of the thermal energy of said expanded gas is transferred to said heat exchange medium; passing said heat exchange medium in gaseous form to said motor means of said energy conversion means whereby to produce said mechanical energy and returning the heat exchange medium in a closed system to said heat exchanger means.

10. An improved power system for use in converting solar energy into usable and storable energy, said improved system comprising, in combination:
    (a) solar heat collector means operable for utilizing the sun's rays to heat a fluid medium and convert it from liquid to an expanded gas;
    (b) energy conversion means including motor means operatively connected with said solar heat collector means for utilizing said expanded gas to produce mechanical energy and then return said fluid to the solar heat collector;
    (c) means operatively connected with said energy conversion means for utilizing a portion of said mechanical energy to operate a power driven unit and another portion of said mechanical energy to drive compressor means to increase the pressure of a second fluid in response to change in ambient or internal parameters;
    (d) control means operatively associated with said energy conversion means to effect adjustment of the ratio of pressurization of said motor means to said compressor means;
    (e) storage means operatively connected with said energy conversion means for collecting and storing said pressurized second fluid for subsequent use to operate a power driven unit.

11. The power system described in claim 10 further characterized in that said storage means involves change of stage of the operative fluid from gaseous to liquid form or from liquid to solid form reversibly.

12. The power system described in claim 10 further characterized in that there is a plurality of said motor means as to which control may cause one or more to be operative during a given period of time depending upon ambient parameters, power demand and storage need.

13. The power system described in claim 10 further characterized in that control means operatively associated with said energy conversion means determines the portion of mechanical energy produced by said motor means which is used to operate a power driven unit and the portion used to increase the pressure of a second gas in storage means.

14. The power system described in claim 10 further characterized in that control means operatively associated with said storage means measure power demand and employ an alternative energy source when insolation and storage power supply prove insufficient to meet said power demand.

15. An improved power system for use in converting solar energy into storable energy, said improved system comprising, in combination:
(a) solar heat collector means operable for utilizing the sun's rays to heat a fluid medium for use in heat exchange means to heat a second fluid and convert said second fluid into an expanded gas;
(b) energy conversion means operatively associated with said heat exchanger means for utilizing said expanded gas to operate motor means to produce mechanical energy and then returning said gas to the heat exchanger;
(c) means operatively connected with said motor means utilizing a portion of said mechanical energy to increase the pressure of a second gas and another portion to propel a power-using device;
(d) control means operatively associated with said energy conversion means to effect adjustment of the ratio of pressurization of said motor means to said compressor means;
(e) storage means operatively connected with said energy conversion means for collecting and storing said pressurized second gas for subsequent use to operate a power driven unit.

* * * * *